United States Patent [19]
Tanaka

[11] Patent Number: 5,365,380
[45] Date of Patent: Nov. 15, 1994

[54] VARIABLE-SPEED VIDEO SIGNAL REPRODUCING APPARATUS ABLE TO SWITCH VIDEO SIGNAL INTERPOLATION

[75] Inventor: Yasuyuki Tanaka, Tokyo, Japan

[73] Assignee: Canon Kabushiki Kaisha, Tokyo, Japan

[21] Appl. No.: 39,692

[22] Filed: Mar. 29, 1993

Related U.S. Application Data

[63] Continuation of Ser. No. 585,175, Sep. 20, 1990, abandoned.

[30] Foreign Application Priority Data

Sep. 25, 1989 [JP] Japan .................................. 1-248756

[51] Int. Cl.⁵ ............................................. H04N 5/78
[52] U.S. Cl. ................................. 360/10.30; 360/32; 360/33.1
[58] Field of Search ............... 360/33.1, 36.1, 36.2, 360/9.1, 10.1, 10.3, 32; 358/320, 337, 338, 321

[56] References Cited

U.S. PATENT DOCUMENTS

| | | | |
|---|---|---|---|
| 4,413,289 | 11/1983 | Weaver et al. | 360/51 |
| 4,473,853 | 9/1984 | Corkery | 360/14.3 |
| 4,847,701 | 7/1989 | Suesada | 360/33.1 X |
| 4,862,292 | 8/1989 | Enari et al. | 360/33.1 X |
| 5,168,394 | 12/1992 | Sasho | 360/10.3 |

*Primary Examiner*—Andrew L. Sniezek
*Attorney, Agent, or Firm*—Fitzpartick, Cella, Harper & Scinto

[57] ABSTRACT

In the reproduction of a video signal from tape-shaped recording medium on which plural oblique tracks are formed in parallel manner, the signal processing for interpolating the video signal reproduced by a rotary head is suitably switched according to the transport speed of the tape-shaped recording medium. Thus, satisfactory interpolation can be achieved at different transport speeds, and a reproduced image of satisfactory quality can be obtained.

15 Claims, 9 Drawing Sheets

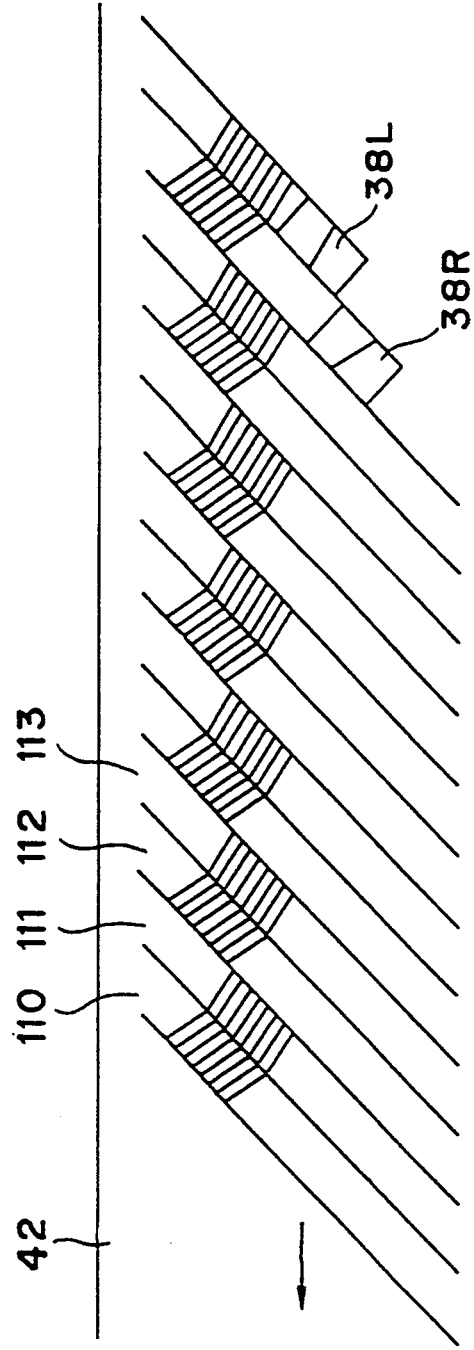

FIG. 5
PRIOR ART
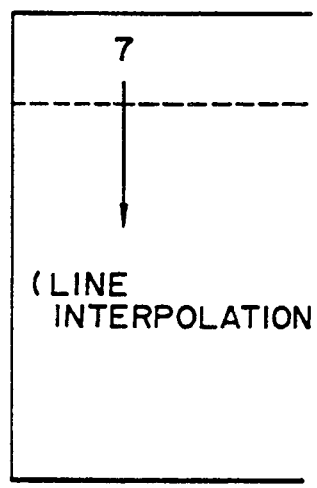
ODD FIELD
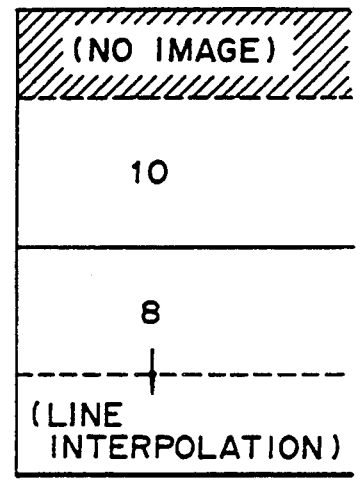
EVEN FIELD
FIG. 6
PRIOR ART
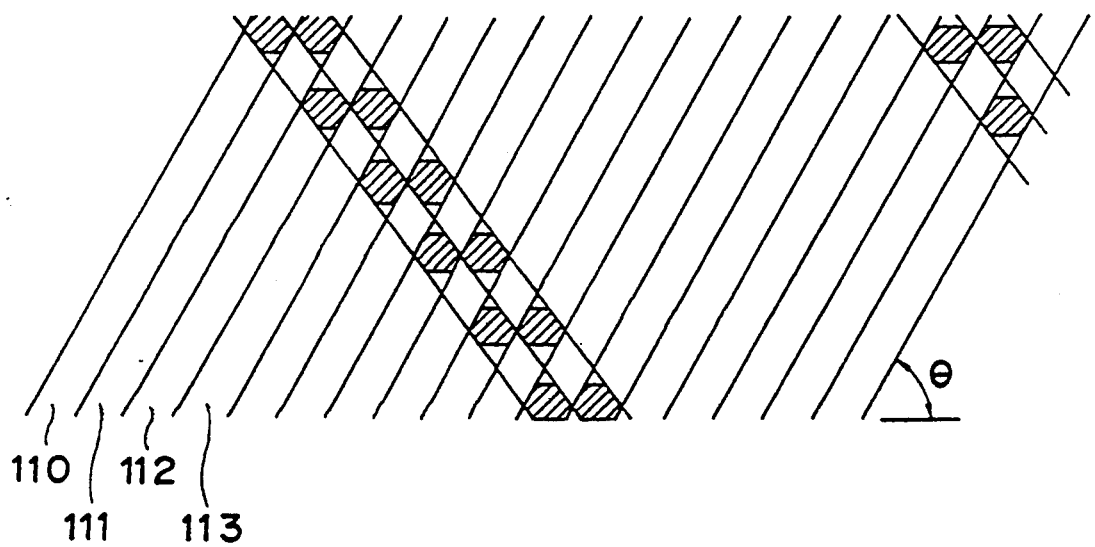

FIG. 7
PRIOR ART

| ODD FIELD |
|---|
| 27 |
| 7 |
| 21 |
| 1 |
| 15 |
| 29 |
| 9 |
| 23 |
| 3 |
| 17 |
| 31 |
| 11 |
| 25 |
| 5 |
| 19 |

| EVEN FIELD |
|---|
| 0 |
| 14 |
| 28 |
| 8 |
| 22 |
| 2 |
| 16 |
| 30 |
| 10 |
| 24 |
| 4 |
| 18 |
| 32 |
| 12 |
| 26 |

FIG. 8
PRIOR ART
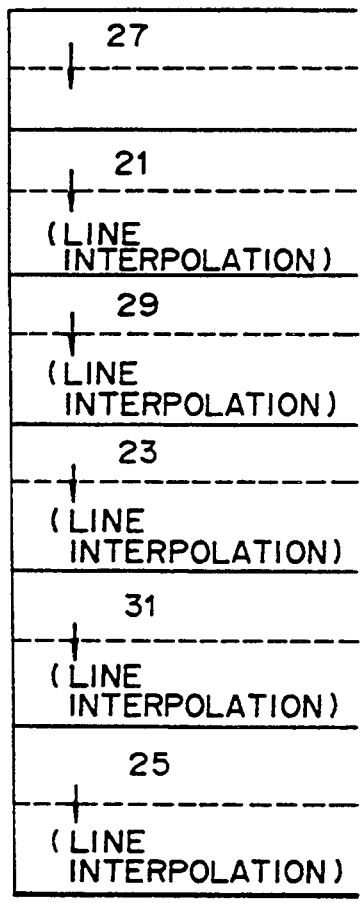
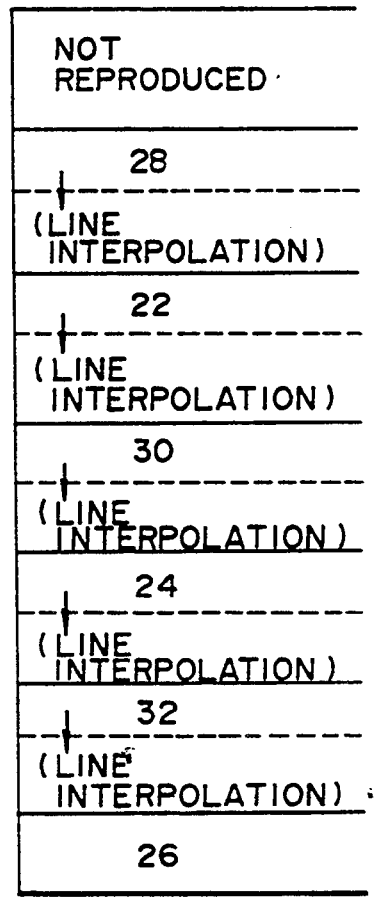
ODD FIELD
EVEN FIELD

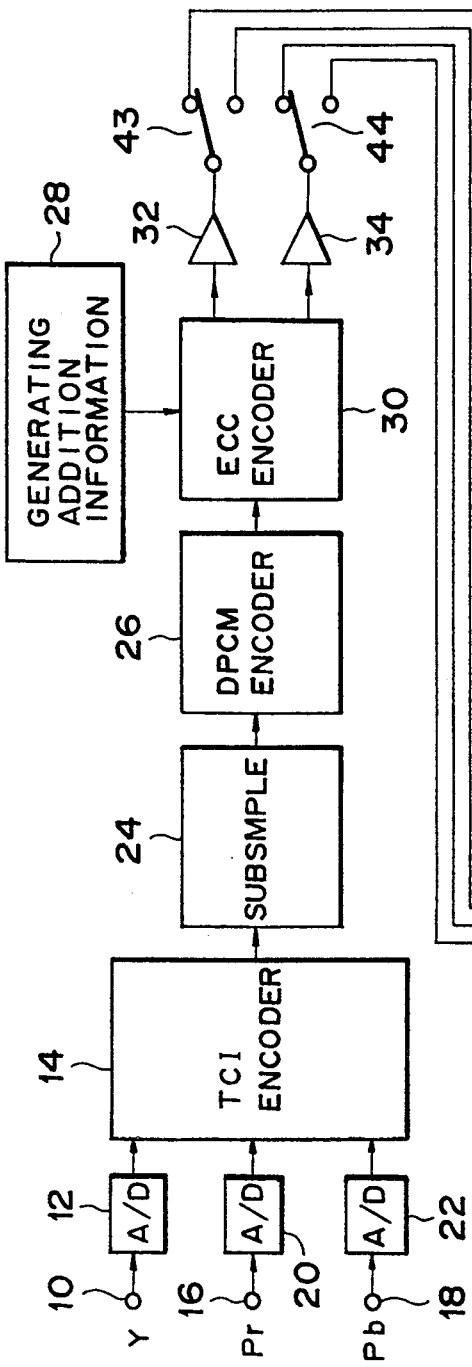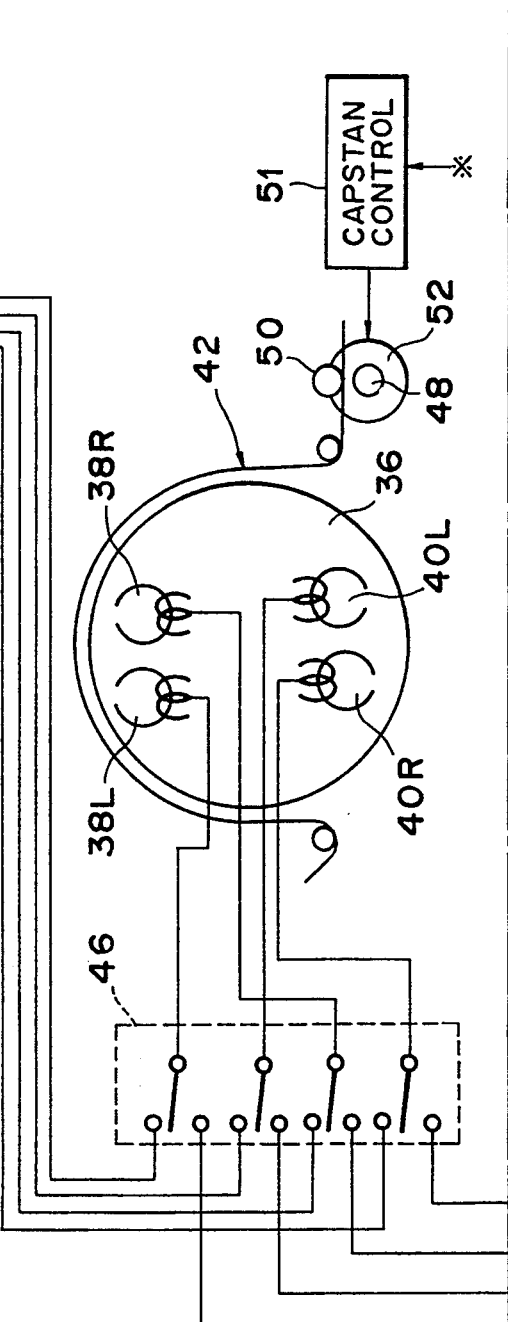

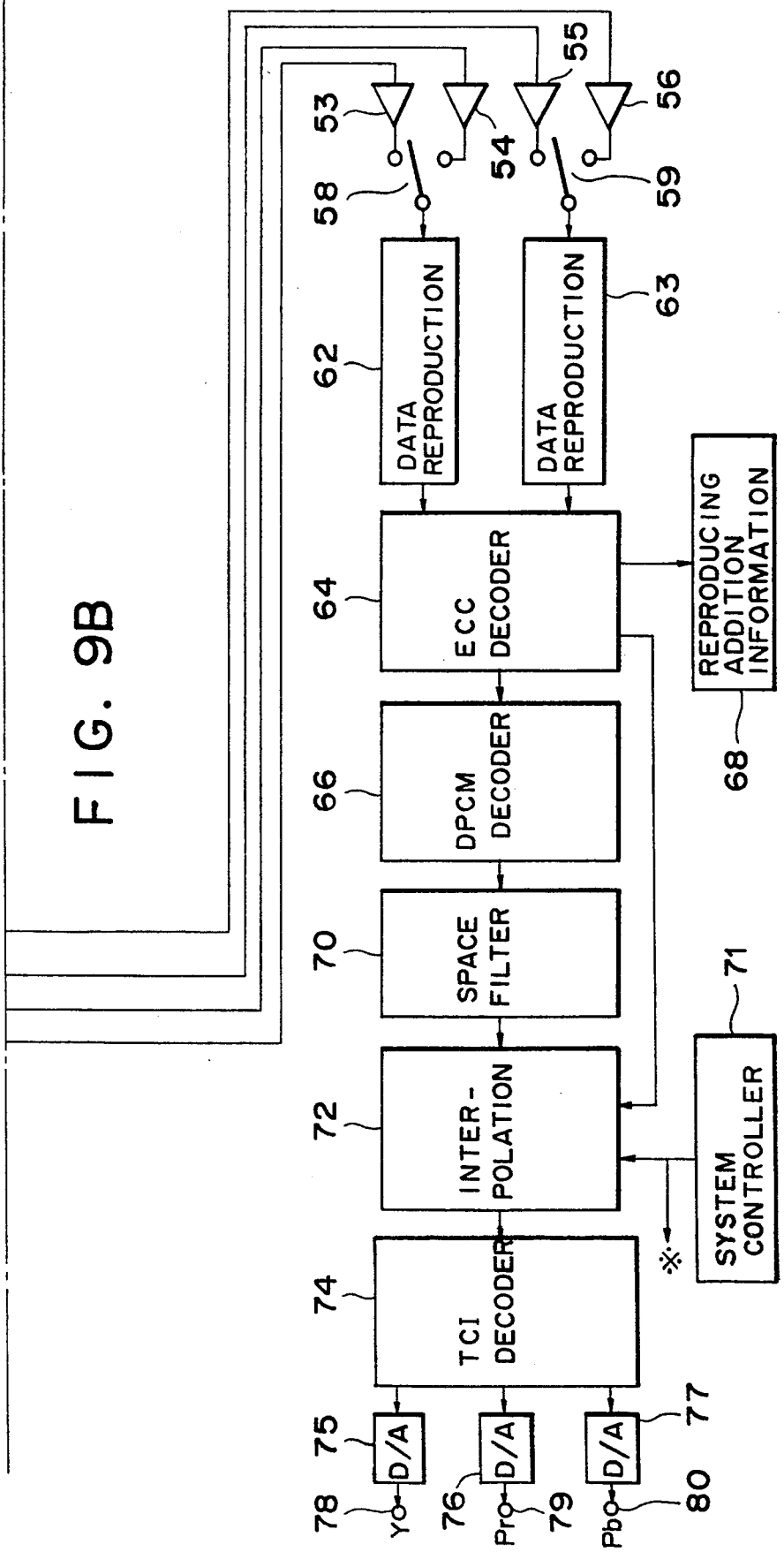

FIG. 11

| |
|:---:|
| 27 |
| 7 |
| 14 |
| 21 |
| 28 |
| 8 |
| 15 |
| 22 |
| 29 |
| 9 |
| 16 |
| 23 |
| 30 |
| 10 |
| 17 |
| 24 |
| 31 |
| 11 |
| 18 |
| 25 |
| 5 |
| 12 |
| 19 |
| 26 |

VARIABLE-SPEED VIDEO SIGNAL REPRODUCING APPARATUS ABLE TO SWITCH VIDEO SIGNAL INTERPOLATION

This application is a continuation of application Ser. No. 07/585,175 filed Sep. 20, 1990, now abandoned.

BACKGROUND OF THE INVENTION

1. Field of the Invention

The present invention relates to a video signal reproducing apparatus, and more particularly to a system for recording and reproducing a video signal by rotating heads in combination with a tape-shaped recording medium, and having a function of variable-speed reproduction.

2. Related Background Art

Among known record/reproducing systems there is a digital video tape recorder (DVTR), and a picture search function with variable speed is known in such a digital video tape recorder.

In the following there will be explained, as an example, a digital video tape recorder for recording and reproducing a high-quality video signal with two sets of paired heads having a mutual phase difference of 180°. FIG. 1 shows the recorded pattern on a magnetic tape 42, obtained with such recorder. The revolution of the recording heads is assumed to be 1,800 rpm.

In FIG. 1, tracks 110 and 111 record the signal of a first field of an interlaced video signal, and tracks 112 and 113 record the signal of a second field. Thus, the video signal of a field is recorded on two tracks. The track 110 is recorded by a magnetic head 38R, while the track 111 is recorded by a magnetic head 38L. The track 112 is recorded by a magnetic head 40R which has a same azimuth angle as that of the head 38R and rotates with a phase difference of 180° with respect thereto, and the track 113 is recorded by a magnetic head 40L which has a same azimuth angle as that of the head 38L and rotates with a phase difference of 180° with respect thereto. FIG. 1 shows a state in the course of recording of a 7th field with the magnetic heads 38R, 38L.

The track 110 records the information, among 1044 effective scanning lines of a frame, of 261 scanning lines of Nos. 000, 004, 008, 012, ..., 1040 of a half of the first field, while the track 111 records the information of 261 scanning lines of Nos. 002, 006, 010, 014, ..., 1042 of another half of the first field. Likewise the track 112 records the information of 261 scanning lines of Nos. 001, 005, 009, 013, ..., 1041 of a half of the second field, and the track 113 records the information of 261 scanning lines of Nos. 003, 007, 011, ..., 1043. FIG. 2 shows a data block of the video information of a scanning line, in which ID indicates the number of scanning line and the number of frame; CRC is an error correction code of ID; DATA is the video data of said scanning line; and C1 is an error correction code for DATA.

In the picture search operation in the conventional structure explained above, the revolution of the capstan motor is changed to increase the tape speed. As the magnetic head will be positioned over two tracks in certain positions, the data reproduction will become impossible in such positions unless so-called DTF (dynamic track following in which the rotary head is shifted in a direction of an axis thereof) is employed. If the tape speed in such search operation is selected as an integral multiple, such as twice or six times, of the standard tape speed, the failure of data reproduction always takes place in a same position in the image frame. In order to prevent such a phenomenon, the search tape speed is usually selected as a non-integral multiple of the standard tape speed.

FIG. 3 shows an example of the tracing pattern of the magnetic heads in case said search tape speed is 2.4 times the standard tape speed. There are shown tracing trajectories 120A–120B by the head 38R, 121A–121B by 38L, 122A–122B by 40R, and 123A–123B by 40L. As shown in FIG. 3, the magnetic head obliquely crosses the tracks by the change in the tape speed. When the azimuthal angle is inverted at every track, signal reproduction is possible in hatched areas in FIG. 3. It is assumed that the signal reproduction is not affected by a track of inverse azimuthal angle, and that the signal reproduction is possible as long as the positional aberration between a head and a track of the same azimuth does not exceed 40%.

Let us consider a case in which the information of a field is recorded in a track in the order from top to bottom of an image. The hatched areas 130, 131 in FIG. 3 contain information of the scanning lines 000–296 of an even field 0, while the hatched areas 132, 133 contain information of the scanning lines 745–1043 of an odd field 1. FIG. 4 is a schematic view of an inter-frame interpolated image obtained by arranging the data of thus successively reproduced scanning lines in a frame memory, wherein numerals indicate the order of fields in time, counted from an even field 0.

On the other hand, FIG. 5 is a schematic view of an image reproduced by storing data which could be reproduced in each rotation of the rotating head, in the frame memory and generating the unreproduced data by interpolation in the frame from the preceding reproducing scanning lines, wherein the numerals indicate the order of fields as in FIG. 6.

Also, FIG. 6 shows the tracing pattern in case the search tape speed is 6.8 times of the standard tape speed. FIG. 7 schematically shows an image obtained by inter-frame interpolation in case the data reproduction is possible within a range of an envelope from 100 to 60% of the normal reproduction, while FIG. 8 schematically shows an image obtained by interpolation within the frame. The oblique scanning angle $\theta$ of the magnetic head on the magnetic tape is usually about 5°–6°. In FIG. 6, the magnetic head appears to run inversely on the magnetic tape because said angle $\theta$ is represented larger for the purpose of clarity, but such inverse running does not take place in practice.

Thus, in the image of a frame reproduced in a turn of the rotating drum, each reproduced image area becomes larger, but the image area that cannot be reproduced also becomes larger when the search tape speed is close to the standard speed. On the other hand, when the search tape speed is faster, the reproduced image area and the unreproduced image area are repeated in smaller portions in the image.

In the conventional picture search operation, therefore, the interframe interpolation provides a satisfactory image in case the search tape speed is close to the standard speed, but the image gives an uncomfortable impression when the search tape speed becomes faster, because the image becomes composed of fractional images different in time.

Such an uncomfortable impression can be reduced even for a fast search tape speed, by employing, for the picture search, the interpolation within a frame and substituting the unreproduced scanning line with a reproduced scanning line closest in time, since the reproduced image portions are scattered in small vertical portions on the image. However, when the search tape speed becomes close to the standard speed, the vertical width of the unreproduced image area becomes larger on the image, and the interpolation within a frame gives an unnatural impression as an image area of significantly lower resolution moves up and down in the image.

SUMMARY OF THE INVENTION

An object of the present invention is to resolve the drawbacks explained above.

Another object of the present invention is to provide a video signal reproducing apparatus with a variable-speed reproducing function, capable of providing a satisfactory reproduced image with a simple structure.

The foregoing objects can be attained, according to an embodiment of the present invention, by a video signal reproducing apparatus comprising:

- a rotary head for reproducing a video signal from a tape-shaped recording medium on which plural oblique tracks are formed in parallel manner;
- transport means for transporting said tape-shaped recording medium in the longitudinal direction thereof;
- interpolation means for interpolating the video signal reproduced by said interpolation rotary head, said means being capable of selectively executing mutually different plural signal processings for interpolation; and
- selector means for selecting the processing, among said plural signal processings, to be executed by said interpolation means, according to the transport speed of said recording medium by said transport means.

Still other objects of the present invention, and the features thereof, will become fully apparent from the following detailed description of the embodiments of the present invention, to be taken in conjunction with the attached drawings.

BRIEF DESCRIPTION OF THE DRAWINGS

FIG. 1 is a view of the pattern of recording formed by a digital video tape recorder on a magnetic tape;

FIG. 2 is a view of a data block including video information of a scanning line;

FIG. 5 is a schematic view of a reproduced image obtained by an intraframe interpolation from the signal reproduced according to the tracing pattern shown in FIG. 3;

FIG. 6 is a view of a tracing pattern of the magnetic head in a 6.8 times search operation;

FIG. 7 is a schematic view of a reproduced image obtained by an interframe interpolation from the signal reproduced according to the tracing pattern in FIG. 6;

FIG. 8 is a schematic view of a reproduced image obtained by an intraframe interpolation from signal reproduced according to the tracing pattern in FIG. 6;

FIGS. 9, 9a and 9b are a block diagram and corresponding circuits of a digital video tape recorder constituting an embodiment of the present invention;

FIG. 11 is a view showing the principle of intrafield interpolation.

DESCRIPTION OF THE PREFERRED EMBODIMENTS

Figure 3:
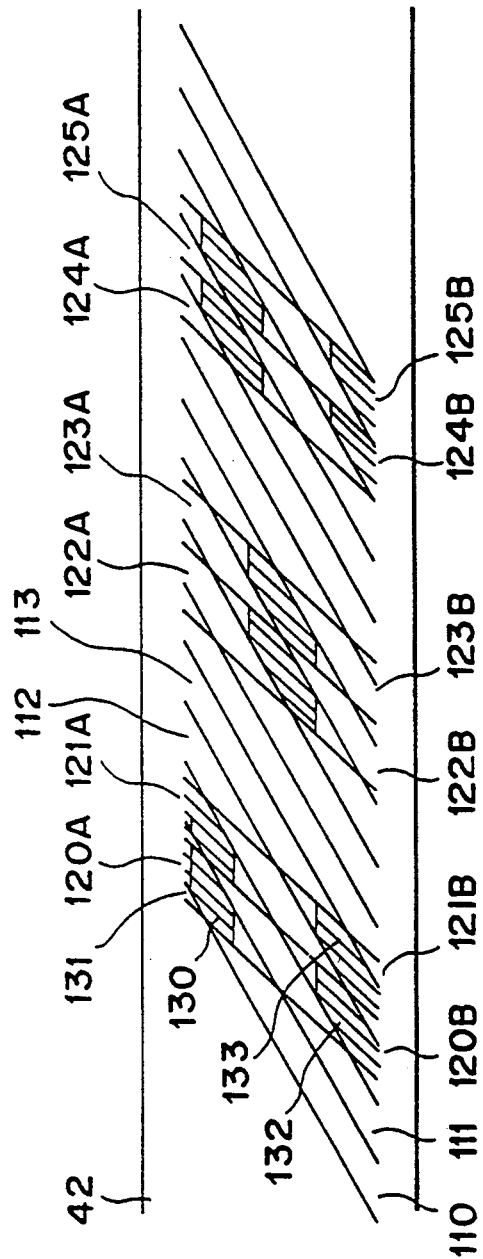
FIG. 3 is a view of a tracing pattern of the magnetic head in a 2.4 times search operation.
Figure 4:
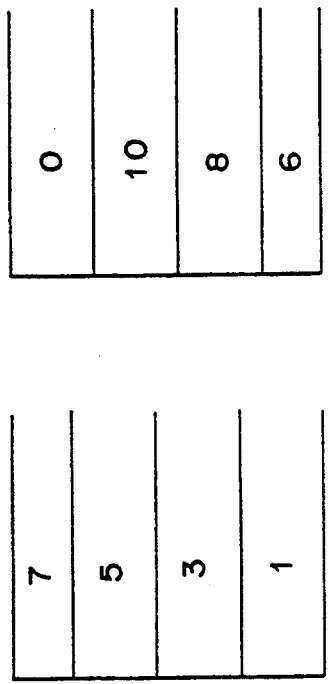
FIG. 4 is a schematic view of a reproduced image obtained by an interframe interpolation from the signal reproduced according to the tracing pattern shown in FIG. 3.

Now the present invention will be clarified in detail by an embodiment thereof applied to a digital video tape recorder for recording and reproducing a $\frac{1}{2}$-interlaced high-quality image signal with 1,125 scanning lines.

FIG. 9 is a block diagram of a digital video tape recorder constituting an embodiment of the present invention, wherein an input terminal 10 receives the luminance signal Y of a $\frac{1}{2}$-interlaced image signal with 1,125 scanning lines and with a frame frequency of 30 Hz. Said luminance signal Y is digitized by an A/D converter 12 and is supplied to a TCI encoder 14. Also input terminals 16, 18 respectively receive the color difference signals Pr, Pb of said image signal, which are digitized by A/D converters 20, 22 and supplied to the TCI encoder 14.

The TCI encoder 14 compresses the color difference data Pr, Pb in time axis and inserts said data alternately in the horizontal flyback period of the luminance data Y in every horizontal scanning line. A subsampling circuit 24 skips the output of the TCI encoder 14 at every other pixel, in such a manner as to select, in the odd field, the pixel positions which are skipped in the even field. In this manner the amount of information can be reduced to $\frac{1}{2}$ without varying the resolution in the vertical and horizontal directions. The output of a subsampling circuit 24 is supplied to a DPCM encoder 26, which compresses a signal of 8 bits in the direction of amplitude into a signal of 4 bits by non-linearly digitizing the difference from a preceding signal, utilizing the correlation of image and assigning a 4-bit code to the result of said digitizing. An additional information generating circuit 28 generates a digitized audio signal and other additional information.

An ECC encoder 30 adds, to the image data from the DPCM encoder 26, ID information indicating the image position at reproduction, and an error correction code, and sends the output to recording amplifiers 32, 34 alternately at each scanning line, in order to reduce the bit rate. The ECC encoder 30 also adds the ID information and the error correction code to the additional information from the additional information generating circuit 28, and releases the resulting signal within the vertical flyback period. The above-mentioned ID information are respectively given powerful error correction codes, separately from the error correction code for the image data.

The rotary drum 36 is provided with a pair of magnetic heads 38R, 38L and another pair of magnetic heads 40R, 40L which are separated by 180° from the first-mentioned heads, and a magnetic tape 42 wraps said rotary drum 36 over an angle in excess of 180°. Selector switches 43, 44 respectively guide the outputs of the recording amplifiers 32, 34 to the magnetic heads 38R, 38L or 40R, 40L which are currently in contact with the magnetic tape 42 wound on the rotary drum 36, through record/reproduction selector switches 46. In a state shown in FIG. 9, the recording currents are supplied to the heads 38R, 38L. In order to reduce the crosstalk between adjacent tracks without a guard band therebetween, the magnetic heads 38L and 38R, or 40L and 40R have mutually opposite azimuthal angles. The magnetic tape 42 is pinched between a capstan shaft 48 and a pinch roller 50, and is advanced by a motor 52 for driving said capstan shaft 48. A capstan control circuit 51 controls the motor 52 so as to drive the magnetic tape 42 at a speed determined by a system controller 71.

The reproducing circuits are constructed in the following manner. The outputs from the magnetic heads 38R, 38L, 40R, 40L are supplied, through switches 46, to reproducing amplifiers 53, 54, 55, 56, and the signals from the tape in contact with the magnetic heads are selected by selector switches 58, 59. Data reproducing circuits 62, 63 reproduce the original data from the reproduced signals obtained from selector switches 58, 59 by equalizing losses in the magnetic recording reproducing system, and extracting a clock component. An ECC decoder corrects the error in the output data of the data reproducing circuit 62, 63 by means of the error correction codes added by the ECC encoder 30, then discriminates the image information and the additional information by the ID information, and sends said image information and additional information respectively to a DPCM decoder 66 and an additional information reproducing circuit 68. The ECC decoder 64 also releases a flag for uncorrectable data.

The additional information reproducing circuit 68 reproduces the audio signal and other additional signals multiplexed in the vertical flyback period. The DPCM decoder 66 expands the amplitude compression conducted by the DPCM encoder 26 and sends the reproduced 8-bit pixel data to a spatial filter 70, which reproduces the data of pixels, skipped in the subsampling circuit 24, from the data of surrounding pixels, and sends the obtained data to an interpolation circuit 72. Thereafter the data are supplied to a TCI decoder 74, which effects time-axis expansion of the color difference signals Pr, Pb alternately multiplexed in the horizontal flyback period of every scanning line, and sends the luminance data Y to a D/A converter 75, color difference data Pr to a D/A converter 76 and color difference data Pb to a D/A converter 77. Said D/A converters 75, 76, 77 convert said digital data into analog signals and send them respectively to output terminals 78, 79, 80.

A system controller 71 for switching the operating mode of the apparatus supplies the capstan control circuit 51 and the interpolation circuit 72 with information on the search speed for the high-speed picture search operation. Based on said search speed information, the capstan control circuit 51 determines the rotating speed of the motor 52, or the transport speed of the magnetic tape 48.

Also based on said search speed information, the interpolation circuit 72 switches the process of interpolation as will be explained later.

Figure 10:
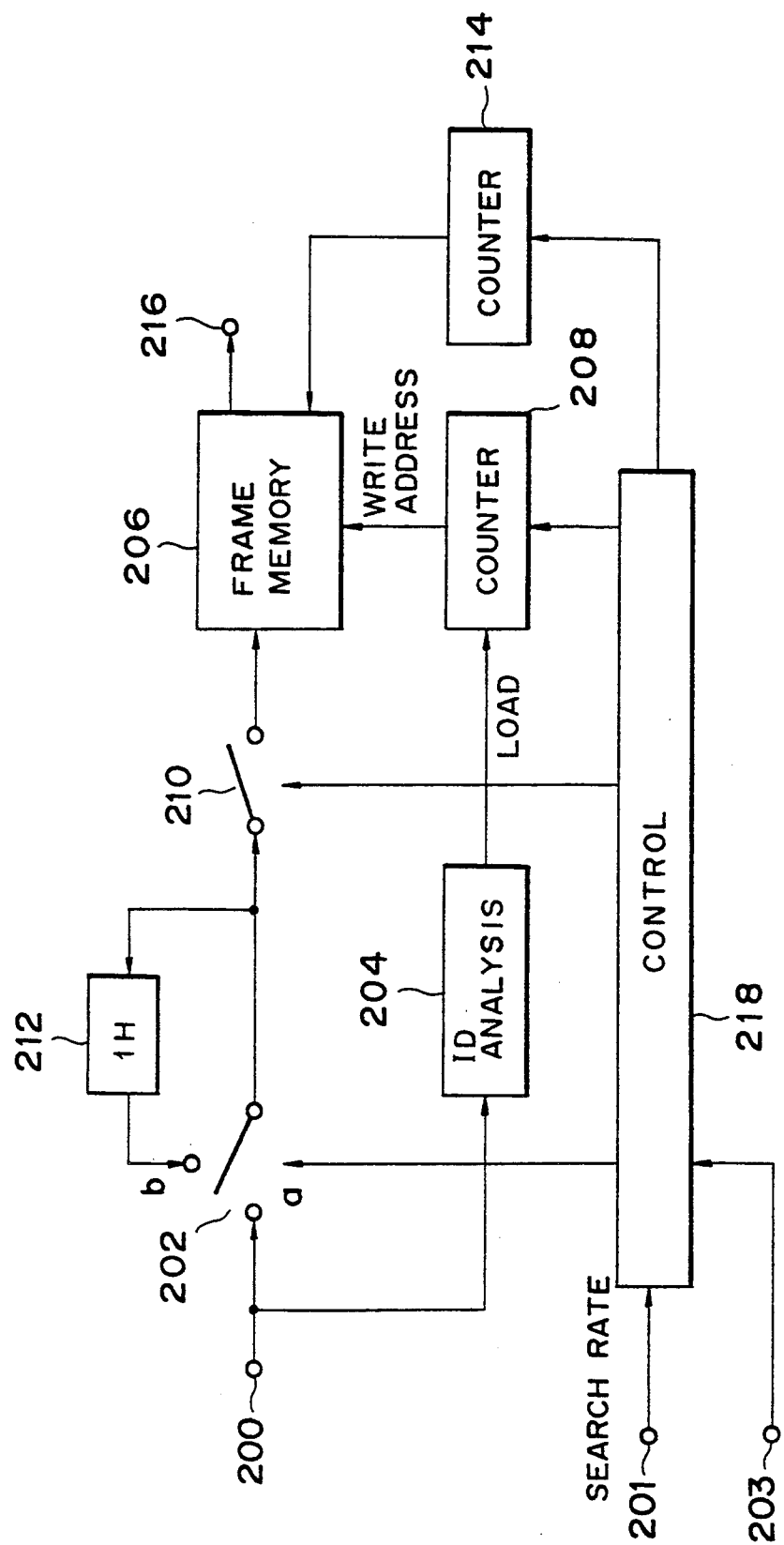
FIG. 10 is a block diagram of an example of the interpolation circuit shown in FIG. 9.

FIG. 10 is a partial block diagram of the digital video tape recorder shown in FIG. 9. An input terminal 200 receives the video data from the spatial filter 70, and said video data are supplied to the contact a of a switch 202 and an ID analysis circuit 204. Said ID analysis circuit 204 analyzes the number of scanning line of the input video data, and sends a write-in address, indicating the storage address of a frame memory 206, to a presettable counter 208, which sends the address signal from the ID analysis circuit 204 to a write-in line address input terminal of the frame memory 206 either without change or after an increase of +2 for line interpolation. A terminal 201 receives the search speed information from the system controller 71, while a terminal 203 receives the error flag from the ECC decoder.

The common contact of the switch 202 is connected to a normally closed switch 210 and a 1H-delay circuit 212, the output of which is supplied to a contact b of the switch 202. Said normally closed switch 210 is connected to a data input terminal of the frame memory 206. A counter 214 is provided for generating a read-out address for the frame memory 206, and an output terminal 216 for releasing data read from the frame memory 206. A control circuit 218 controls the switches 202, 210 and the counter 208 according to the search speed, as will be explained later.

When the control circuit 218 identifies the effective reproduction of image data by the error flag and said image data are supplied to the input terminal 200, the control circuit 218 connects the switch 202 to the contact a, closes the switch 210 and instructs the presettable counter 208 to transmit the address signal from the ID analysis circuit 204 to the frame memory 206 without change, regardless of the search speed information, whereby the data received by the input terminal 200 are stored in corresponding positions of the frame memory 206.

When the search speed information indicates a relatively low search speed (for example six times or less of the standard speed) and the error flag indicates that the effective image data are not reproduced, the control circuit 218 opens the switch 210, thereby prohibiting the data storage into the frame memory 206. In such case there is conducted interframe interpolation, utilizing the image data stored previously in the frame memory 206.

When the search speed information indicates a relatively high search speed and the error flag indicates that effective image data are not reproduced, the control circuit 218 shifts the switch 202 to the contact b, thereby increasing the output of the presettable counter 208 by +2. Thus, the data stored in the frame memory 206 are rewritten by the previously reproduced data, thus effecting intraframe interpolation.

In the foregoing description, the interframe interpolation and the intraframe interpolation are switched according to the search speed, but there may be further added intrafield interpolation. This is achieved by writing the data reproduced in an even field and those reproduced in an odd field (for example scanning lines #0 and #1) in a same position in the field memory, and reading the data without distinction between the even or odd field.

FIG. 11 shows a reproduced image in case of a search operation with a speed 6.7 times of the standard speed, wherein numerals indicate the numbers of fields. As will be understood from FIG. 11, the aberration in time in a frame is reduced. The intrafield interpolation reduces the vertical resolution to a half, but the image quality is improved at a high search speed because the aberration in time is reduced in an image frame.

For achieving the intrafield interpolation in the structure shown in FIG. 10, the output of the lowermost bit of the presettable counter 208 is prohibited to enable the data storage in the addresses where even fields alone are usually stored. Also, in the data read-out, the lowermost bit of the read-out address is set at "0" to achieve the read-out of the same data in the even and odd fields.

The image quality can be further improved by suitably switching the interframe interpolation, intraframe interpolation and intrafield interpolation as explained above.

As will be understood from the foregoing description, the present invention acts to improve the image quality in the picture search operation with an extremely simple structure.

I claim:

1. A video signal reproducing apparatus, comprising:
   a rotary head for reproducing a video signal from a tape-shaped recording medium on which plural oblique tracks are formed in parallel manner;
   transporting means for transporting the tape-shaped recording medium in a longitudinal direction thereof;
   interpolation means for interpolating a video signal reproduced by said rotary head using a plurality of interpolation methods; and
   selection means for selecting said interpolation methods to be used in said interpolation means, according to a transport speed of the recording medium by said transporting means.

2. An apparatus according to claim 1, wherein said plurality of interpolation methods include an intraframe interpolation method in which said interpolation means uses video information in a reproduced image frame, and an interframe interpolation method in which said interpolation means uses video information of another image frame reproduced by said rotary head, and wherein said selection means selects said intraframe interpolation method when the transport speed is faster than a predetermined speed, and selects said interframe interpolation method when the transport speed is slower than said predetermined speed.

3. An apparatus according to claim 2, wherein said video information used in said intraframe interpolation method includes video information of a line reproduced immediately before the reproduced video signal.

4. An apparatus according to claim 2, wherein said video information used in said interframe interpolation method includes video information of the same line as the reproduced signal of said another frame.

5. An apparatus according to claim 1, wherein said video signal comprises a digital signal, and wherein said interpolation means operates according to an error correction code contained in said digital signal.

6. A video signal reproducing apparatus, comprising:
   a rotary head for reproducing a video signal from a tape-shaped recording medium on which plural oblique tracks are formed in parallel manner;
   transporting means for transporting said tape-shaped recording medium in the longitudinal direction thereof;
   interpolation means for interpolating a reproduced video signal reproduced by said rotary head; and
   selection means for changing an interpolation operation of said interpolation means between a first interpolation operation and a second interpolation operation according to a transporting speed of said tape-shaped recording medium, said first interpolation operation being an operation in which said interpolation means interpolates said reproduced video signal with video information in a frame of said reproduced video signal, in response to a first transporting speed of said tape-shaped recording medium, and said second interpolation operation being an operation in which said interpolation means interpolates said reproduced video signal with the video information of a frame other than said frame of said reproduced video signal, in response to a second transporting speed slower than said first transporting speed.

7. A video signal reproducing apparatus, comprising:
   (a) driving means for relatively driving a recording medium and a rotary head, said driving means having a plurality of driving modes;
   (b) interpolation means for interpolating a video signal reproduced by said rotary head, said interpolation means selectively performing a plurality of different interpolation operations including at least an intraframe interpolation and an interframe interpolation operation; and
   (c) control means for cooperatively controlling said driving means and said interpolation means to change the interpolation operation of said interpolation means between said plurality of different interpolation operations in accordance with the driving mode.

8. A video signal reproducing apparatus according to claim 7, wherein said driving means has a first mode in which a driving speed is higher than a predetermined speed and a second mode in which the driving speed is lower than said predetermined speed.

9. A video signal reproducing apparatus according to claim 8, wherein said interpolation means performs the intraframe interpolation when said driving means is in the first mode, and performs the interframe interpolation when said driving means is in the second mode.

10. A video signal reproducing apparatus according to claim 7, wherein said recording medium comprises a tape-shaped recording medium.

11. A video signal reproducing apparatus, comprising:
    reproducing means for reproducing a video signal;
    interpolation means for interpolating the video signal reproduced by said reproducing means, said interpolation means interpolating the video signal by selectively using a plurality of different interpolation methods; and
    control means for cooperatively controlling said reproducing means and said interpolation means to change the interpolation method of said interpolation means in accordance with a reproduction speed of said reproducing means.

12. An apparatus according to claim 11, wherein said plurality of different interpolation methods include an intraframe interpolation method and an interframe interpolation method.

13. An apparatus according to claim 12, wherein said interpolation means uses the intraframe interpolation method when said reproducing means reproduces the video signal at a speed higher than a predetermined speed, and uses the interframe interpolation method when said reproducing means reproduces the video signal at a speed lower than the predetermined speed.

14. An apparatus according to claim 11, wherein said reproducing means reproduces the video signal from a recording medium comprising magnetic tape.

15. An apparatus according to claim 11, wherein said reproducing means reproduces the video signal from a recording medium, and comprises a rotary head and driving means for driving the recording medium.

* * * * *

UNITED STATES PATENT AND TRADEMARK OFFICE
CERTIFICATE OF CORRECTION

PATENT NO. : 5,365,380
DATED : November 15, 1994
INVENTOR(S) : Yasuyuki TANAKA

It is certified that error appears in the above-indentified patent and that said Letters Patent is hereby corrected as shown below:

COVERPAGE

ITEM [56], Right Column

"Fitzpartick" should read --Fitzpatrick--.

COLUMN 1

Line 54, "scanning" should read --the scanning--.
Line 55, "frame" should read --the frame--.

COLUMN 2

Line 1, "a" should read --the--.
Line 38, "times of" should read --times--.

COLUMN 3

Line 27, "said interpolation" should read --said--.
Line 28, "means" should read --interpolation means--.
Line 64, "signal" should read --signal--.

COLUMN 4

Line 52, "are" should read --is--.

COLUMN 5

Line 61, "line" should read --lines--.

UNITED STATES PATENT AND TRADEMARK OFFICE
CERTIFICATE OF CORRECTION

PATENT NO. : 5,365,380

DATED : November 15, 1994

INVENTOR(S) : Yasuyuki TANAKA

It is certified that error appears in the above-indentified patent and that said Letters Patent is hereby corrected as shown below:

<u>COLUMN 6</u>

Line 53, "times of" should read --times--.

Signed and Sealed this

Ninth Day of May, 1995

Attest:

BRUCE LEHMAN

Attesting Officer     Commissioner of Patents and Trademarks